May 9, 1961

D. BIERMANN 2,983,279

FLUID MIXING VALVE

Filed March 10, 1958

INVENTOR:
David Biermann

United States Patent Office 2,983,279
Patented May 9, 1961

2,983,279

FLUID MIXING VALVE

David Biermann, 1101 Forest Ave., Piqua, Ohio

Filed Mar. 10, 1958, Ser. No. 720,423

10 Claims. (Cl. 137—100)

My invention relates to improvements in fluid mixing valves particularly of the domestic type used for bath tubs, shower, etc.

One object of my invention is, to devise a valve assembly which has separate inlet connections for the cold and hot fluid and a single discharge connection for the mixture of cold and hot fluids.

A second object is to provide a single manual control to regulate the flow of fluid at the discharge connection.

A third object is to provide a single manual control to regulate the mixing of the hot and cold fluids.

A fourth object is to provide means for equalizing the pressure of the hot and cold fluids before they enter the mixing chamber, thereby eliminating the effect of variations of the fluid supply pressure upon the proportion of each fluid passing through the valve. This object is directed towards maintaining constant discharge temperature irrespective of variations in pressures of either of the incoming fluids.

A fifth object is to provide a simple and economical mixing valve which is free from maintenance troubles which can be produced at a minimum of cost.

I attain these objects by mechanism illustrated in the accompanying drawing, in which—

Figure 1:
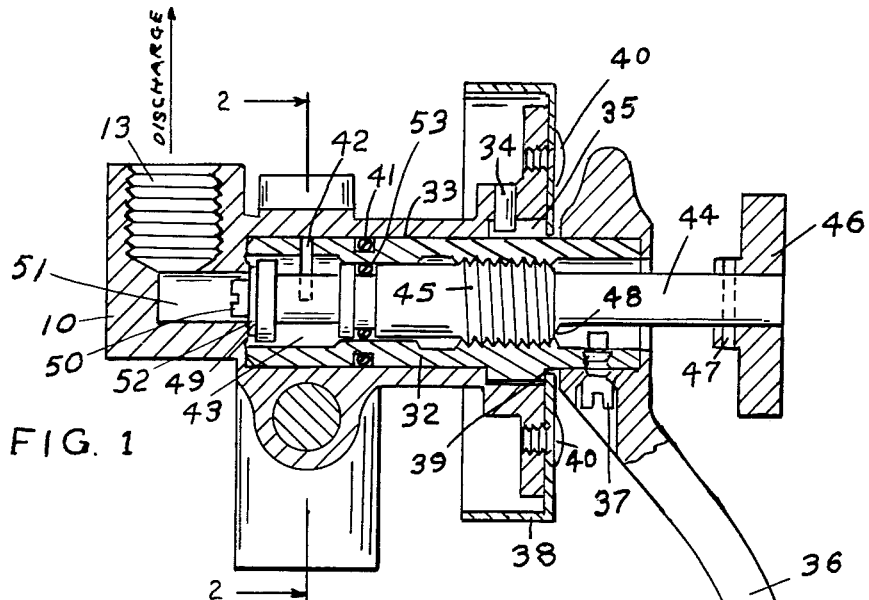
Figure 2:
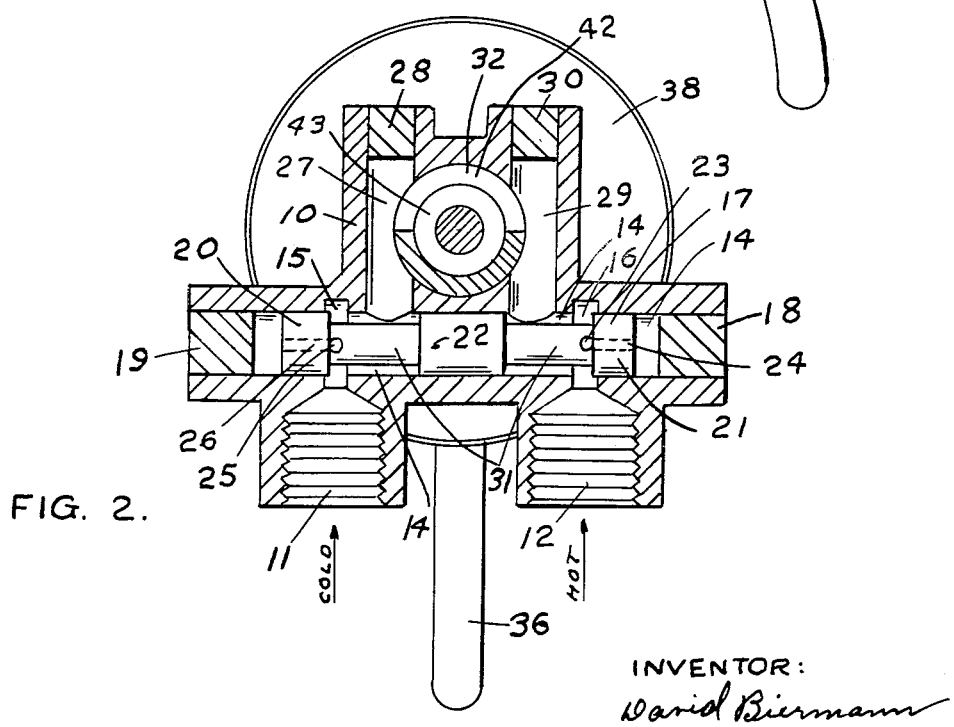

Figure 1 is a vertical section of the valve assembly, and Figure 2 is a vertical section taken along line 2—2 of Figure 1 at right angles thereto.

Similar numerals refer to similar parts throughout the two views.

Referring to Figures 1 and 2, valve body 10 is provided with cold fluid entrance connection 11, hot fluid entrance connection 12, and discharge connection 13. Cylindrical cross channel 14 is drilled thru valve body 10 immediately above fluid entrances 11 and 12 and in the same plane. Channel 14 is enlarged by annular cavities 15 and 16 which communicate with cold and hot entrances 11 and 12 respectively. Slidably mounted in cross channel 14 is shuttle valve spool 17. Both ends of cross channel 14 are closed by plugs 18 and 19.

Shuttle valve spool 17 is comprised of three pistons 20, 21 and 22 mounted on a single shaft 31 and slidably moveable in cross channel 14. Piston 20 is mounted at the cold fluid entrance 11 and arranged to control the flow of cold fluid thru cavity 15 by opening or sealing off said cavity from the cross channel 14 as a function of its position. Likewise piston 21 is arranged to seal off cavity 16 of the hot fluid entrance. Piston 22, located at the center of shuttle valve 17 prevents the hot and cold fluids from mixing at this point. The piston 22 double head areas are equal to the inner areas of pistons 20 and 21 which are exposed to the fluid pressure in cavities 15 and 16 and the adjacent cross channel 14. Cross hole 23 and axial hole 24 drilled in the right hand end of shuttle valve spool 17 equalizes the pressure on both ends of piston 17. Since the inner area of piston 21 is balanced by opposing area of piston 22, the outer area of piston 17 is acted upon by the fluid pressure existing in cavity 16 and the adjacent cross channel 14.

Likewise, cross hole 25 and axial hole 26 are drilled in the left end of shuttle valve spool 17, which allows fluid pressure existing in cavity 15 and the adjacent cross-channel 14 to act on the left end of piston 20.

Vertical channel 27 intersects cross channel 14 on the left side of valve body 10 as seen in Figure 2, between pistons 20 and 22, and is sealed at the upper end by plug 28. Also, vertical channel 29 intersects cross channel 14 in the right side of valve body 10, between pistons 22 and 21, and is sealed at the upper end by plug 30.

The object of the shuttle valve spool 17 is to equalize the pressure between channels 27 and 29, regardless of the pressures existing in cold and hot entrances 11 and 12. If the pressures in channels 27 and 29 are kept equal at all times, the proportion of hot and cold fluid flowing will remain constant as long as the setting of the mixing valve, later to be described, is unchanged. This, in turn, will result in holding the temperature of fluid at discharge 13 constant even though the pressures at hot and cold entrances may vary. If this pressure equalizing device were not present, a change in pressure of either of the entering fluids would result in a change in the rate of flow of that fluid, which would in turn result in a change in the proportion of hot to cold fluid being mixed and cause a change in the temperature of the fluid being discharged.

Operation of the equalizing pressure device will be described here as follows:

With shuttle valve spool 17 in mid position as shown in Figure 2, fluid entering cold entrance 11 is free to flow into cavity 15, left end of passage 14 and into channel 27 with substantially no drop in pressure. This pressure also acts on the left end of piston 20 tending to move shuttle valve spool 17 to the right. The same conditions also exist with respect to the hot fluid entering at 12; except the pressure tends to move the shuttle valve spool 17 to the left in opposition to the pressure existing in the cold fluid channels. Now if the pressure at 11 increases, the pressure acting on piston 20 also will increase, which will unbalance the state of equilibrium of spool 17 tending to move it to the right. This will continue until piston 20 starts to seal off cavity 15 from channels 14 and 27, thus causing the pressure to drop as the fluid enters channel 14 from the cavity 15. As soon as the pressure in channel 27 becomes equal to the pressure in channel 29, the pressures acting on the opposite ends of shuttle valve 17 (viz., pistons 20 and 21) will likewise become equal, so further movement of shuttle valve 17 is halted. If, however, shuttle valve 17 moves too far to the right, or overshoots, then the pressure in channel 27 will drop even further and lower than the pressure in 29. This unequalization in pressure will cause shuttle valve spool 17 to move to the left, just far enough to again equalize the pressures in channels 27 and 29.

The reverse action occurs if the pressure at entrance 12 exceeds that of entrance 11, resulting in equal pressures in channels 27 and 29.

In the event shuttle valve 17 would tend to oscillate back and forth rapidly, dampening action to eliminate such oscillations is already present in the system. Fluid must pass thru bleed holes 23, 24, 25 and 26 at any time the shuttle valve 17 moves in either direction. Resistance to the flow thru these small holes is proportional to the areas of the holes and the square of the velocity. Thus, rapid oscillations will create high forces opposing the oscillations and they will be dampened out, or prevented from even starting.

Friction between shuttle spool 17 and cross channel 14 would cause an unbalance in pressure. Friction, however, can be reduced to a negligible quantity by providing proper clearances between the surfaces. A relatively loose fit of spool 17 in channel 14 will not effect the leakage to the point where the valve will not function properly, as can be seen from a further analysis of the conditions.

Leakage past piston 22 will not exist because the pressures on both sides of the piston are equal. Leakage past pistons 20 or 21 is of no consequence as there is no pressure differential present. Leakage from cavity 15 to cross channel 14 or from cavity 16 to cross channel 14 is not of great importance because some flow is anticipated at all times anyway; hence there is no reason to seal the passages completely.

It should be pointed out that the pressure equalizing mechanism need not be a part of the mixing valve but could be built into a separate unit and used for a variety of purposes in addition to that described here.

The mixing part of the valve assembly is described as follows:

Mixing valve sleeve 32 is rotatably mounted in stepped hole 33 formed in valve body 10. Rotation of sleeve 32 is limited to a fraction of one revolution by stop pin 34 engaging stops 35 machined in valve sleeve 32. Valve sleeve 32 is manually rotated by handle 36 which is secured to sleeve 32 by screw 37. Sleeve 32 is prevented from sliding out of hole 33 by cup 38 which engages shoulder 39 formed in sleeve 32. Cup 38 is fastened to valve body 10 by screws 40. Fluid is prevented from leaking out thru the clearance space provided between hole 33 and sleeve 32 by annular seal 41.

Hole 33 and sleeve 32 intersect vertical channels 27 and 29 as noted in Figure 2; the degree of overlapping is made use of in the functional operation of the mixing valve. At the intersection of these cylinders, slot 42 is machined in sleeve 32, extending from the upper surface to the centerline. This slot 42 allows fluid from channels 27 and 29 to enter into mixing chamber 43 and become mixed.

The proportion of each fluid, with respect to the other, being mixed will depend upon the relative cross sectional area of slot 42 exposed to each channel (27 or 29). The quantity of each fluid entering mixing chamber is equal when handle 36 is positioned in the neutral position as shown, because the slot 42 is equally exposed to channels 27 and 29. Moving lever 36 to the left as shown in Figure 2, however, will reduce the exposed area of slot 42 to channel 27 and increase the exposed area of slot 42 to channel 29; hence, less cold fluid and more hot fluid will enter mixing chamber 43. This, of course, will result in increasing the temperature of the fluid in mixing chamber 43. The reverse is true if the handle is moved to the right. Stop 35 is adjusted to provide complete closing of either hot or cold passages. Slot 42 could also be machined in other shapes, such as round or elongated holes drilled thru the side of sleeve 32.

The mechanism controlling the rate of flow is described as follows:

Valve spindle 44 is axially threaded into sleeve 32 by means of screw threads 45. Valve spindle 43 is manually rotatable by means of knob 46 which is secured to spindle 43 by means of pin 47. Spindle 43 is prevented from unscrewing beyond a predetermined point by screw 37 abutting against shoulder 48. At the inner end of spindle 44 is valve washer 49 secured by screw 50. Washer 49 seals against flow from mixing chamber 43 to passage 51, which, in turn, communicates with discharge part 13.

The volume of flow from chamber 43 to channel 51 is regulated by rotating knob 46, thereby controlling the flow area between washer 49 and valve seat 52.

Leakage of fluid thru the clearances provided between spindle 44 and sleeve 32 is prevented by annular seal 53.

Inasmuch as spindle 44 is carried by sleeve 32, rotation of the latter for the purpose of adjusting the temperature will not affect the rate of flow because there will be no movement of spindle 44 with respect to sleeve 32.

Changing the rate of flow by adjusting knob 46 will have no effect on the discharge temperature because relative areas of slot 42 exposed to the channels 27 and 29 is not changed; hence, the proportion of each fluid entering mixing chamber 43 is not changed.

My invention is not necessarily limited to the construction shown. For example, the shuttle valve mechanism which is used to equalize the pressures before entering the mixing valve could be incorporated in a separate housing or into other mechanisms requiring a pressure equalizing system.

The overall operation of the pressure equalizing mechanism is described in conjunction with the mixing portion of the valve, as follows:

As noted above, the object of the pressure equalizing mechanism is to provide for equal pressures in fluid channels 27 and 29, in order that the proportion of fluid being mixed is not disturbed by fluctuating pressures at entrance ports 11 or 12. This requirement can only be accomplished if there is a restriction in flow, or pressure drop, between channel 27 and mixing chamber 43, and also between channel 29 and mixing chamber 43. If there is no restriction to the flow at slot 42, the pressure existing in channel 27 will always be equal to the pressure in channel 29, regardless of the position of valve spool 17, because channel 27, slot 42, mixing chamber 43, and channel 29 will all comprise in effect one chamber where the pressure is equal.

Slot 42, therefore, must constitute a restriction to the flow of fluid; perhaps 10 to 50 percent of the total restriction in the entire fluid mixing valve. If the pressure at the cold entrance port 11 increases, the pressure in chamber 15, 14 and channel 27 will also increase. This will cause an increase in flow from channel 27 thru slot 42; which, in turn, will create a greater pressure drop between channel 27 and mixing chamber 43.

This increase in cold fluid will also cause a decrease in hot fluid because a greater percentage of the total fluid will be supplied by the cold entrance port 11. This decrease in hot fluid flowing thru slot 42 will result in a decrease in pressure drop between channel 29 and mixing chamber 43.

The net effect will be to increase pressure differential between channels 27 and 29, which will cause valve spool 17 to move to the right, as viewed in Figure 2; which will tend to close the passage at chamber 15 and increasing the pressure drop between entrance port 11 and channel 27, thus reducing the flow and bringing the pressure in channel 27 to equal that in channel 29.

The reverse of the above would be true if the pressure at entrance port 11 decreased; or, if the pressure at entrance port 12 increased.

In the event that the total volume of flow being discharged at 13 was reduced to a very small flow or stopped, an unbalance in pressure at entrance ports 11 and 12 would result in circulation from the high pressure side of the valve to the low pressure side. Any such circulation would, however, result in a pressure differential between channels 27 and 29 because of the restriction of slot 42. This pressure differential would cause valve spool 17 to move in a direction such as to reduce the flow of the incoming fluid. This process would continue until the pressure differential between channels 27 and 29 would approach zero, at which time the flow circulation would also approach zero.

Experience with working models of this mixing valve indicates that the objects set forth at the beginning of this specification are fully realized for all practical purposes. For example: (1) The discharge temperature is not affected by changes in flow. (2) The discharge volume is not affected by a change in the temperature control. (3) The discharge temperature remains constant for a wide range of pressure changes at either inlet port; although the discharge flow is affected by pressure changes at the inlet ports. In the event the flow at one inlet port is completely cut off, the flow at the other is likewise cut off by action of valve spool 17 which cuts off the discharge flow at 13 except for the small leakage in the system.

Having described my invention, what I claim is:

1. In a fluid mixing valve, a valve body, a hot fluid entrance port, a cold fluid entrance port, a mixed fluid discharge connection, a cylindrical cross channel intersecting said two entrance ports, said entrance ports each communicating with annular cavities surrounding said cross channel, a floating valve spool slidably mounted within said cross channel and of a length greater than the spacing between the annular cavities but less than the length of the cross channel, said spool consisting of a cylinder with two annular grooves formed at approximately the location of said annular cavities but extending towards the center to a greater degree, said spool also formed with bleed holes drilled from each end in to the nearest annular groove, said spool proportioned such that when it is located at the right end of said cross channel said spool seals off the annular cavity nearest the left end while the annular cavity near the right end communicates with the annular groove at the right end of said spool, or vice versa when said spool is located at the left end of said channel, a hot fluid channel intersecting said cross channel and communicating with said annular groove formed in said spool nearest said hot fluid entrance, a corresponding cold fluid channel intersecting said cross channel and communicating with said annular groove formed in said spool nearest said cold fluid entrance, a cylindrical cavity formed in said valve body and communicating with said channels by virtue of the fact that the channels are spaced such as to intersect said cylindrical cavity on opposite sides, a hollow sleeve rotatably mounted in said cavity, a handle attached to said sleeve for manual rotational adjustment thereof, a slot extending approximately half way around said sleeve and communicating equally with about half of each fluid passages when said handle is in the neutral position, stops positioned such as to allow said sleeve to rotate and position said slot to fully open one channel while closing the other channel or vice versa, a mixing chamber within said sleeve communicating with said slot, a channel connecting said mixing chamber with said discharge connection, and manually operated valve closing said discharge channel.

2. In a fluid mixing valve as described in claim 1, said manually actuated valve controlling the flow of discharge fluid, comprising a valve seat formed in said valve body, a valve pad cooperating with said seat to seal said valve, a valve stem supporting said body, said stem threaded for combination axial and rotational movement, and a handle for actuating said stem.

3. In a fluid mixing valve, a valve body, a hot fluid supply connection, a cold fluid supply connection, a discharge connection, a mixing chamber within said body, a discharge passage connecting said discharge connection with said mixing chamber, a manually operable valve installed in said discharge passage for controlling the discharge flow, a hot fluid passage leading from said hot fluid supply connection to said mixing chamber, a cold fluid passage leading from said cold fluid supply connection to said mixing chamber, a manually rotatable sleeve member closely fitted to said mixing chamber having valve ports arranged for alternately closing said hot and cold fluid passages, and a unit for equalizing the pressure existing in the said two supply passages leading to said mixing chamber comprising; a closed cylinder intersecting said two supply passages, said cylinder having annular grooves formed around said cylinder at the juncture of each of the hot and cold fluid supply connections, a three piston spool element slidably mounted within said closed cylinder, said spool element having a piston mounted at both ends of a rod arranged for alternately sealing said annular grooves communicating with said hot and cold supply connections without closing the downstream two passages leading to the mixing chamber, and a central piston separating said hot and cold supply passages, said spool element having vent passages drilled thru said end pistons, a flow restriction located in each of said cold and hot fluid supply passages between said closed cylinder and said mixing chamber, said restrictions comprising 10 to 50 percent of the total flow restrictions within said mixing valve.

4. Apparatus as described in claim 3 in which said flow restrictions are also said valve ports arranged for alternately closing said hot and cold fluid passages.

5. Apparatus as described in claim 3 in which said flow restrictions are in the form of slots machined circumferentially in said manually rotatable sleeve member, said sleeve manually rotatable to close said hot fluid passage while opening said cold fluid passage, or vice versa, without altering the sum total of the hydraulic restriction values introduced by said slots.

6. Apparatus as described in claim 3, wherein the sum of the total flow resistances constitute a pressure drop differential between said hot and cold supply passages sufficient to move said spool element when the pressures in said hot and cold supply passages are unequal.

7. A fluid mixing valve having a valve body, a hot fluid entrance port, a cold fluid entrance port, a mixed fluid discharge port, a cup shaped cavity formed in said valve body, a discharge channel extending from the base of said cavity to said discharge port, a cylinder formed in said valve body closed at both ends, a hot fluid annular groove formed near one end of said cylinder and communicating with said hot fluid port, a cold fluid annular groove formed near the opposite end of said cylinder and communicating with said cold fluid entrance port, a hot fluid channel intersecting said cylinder near said hot fluid annular groove and communicating with a side of said cup shaped cavity, a cold fluid channel intersecting said cylinder near said cold fluid annular groove and communicating with a side of said cup shaped cavity but displaced from said hot fluid channel, a floating valve member slidably mounted within said cylinder and of a length less than the length of said cylinder, said valve member having a hot fluid piston positioned to cover said hot fluid annular groove when said valve member is at one extreme position only, a vent hole connecting each face of said hot fluid piston, said valve member also having a cold fluid piston positioned to cover said cold fluid annular groove when said valve member is at the opposite extreme position only, a vent hole connecting each face of said cold fluid piston, said valve member also having a centrally located piston, said valve member having a piston rod of reduced diameter connecting said hot fluid piston with said centrally located piston and also connecting said cold fluid piston with said centrally located piston, a sleeve closely fitted to rotate within said cavity, said sleeve provided with two abutments spaced circumferentially, a stop integral with said valve body and positioned between said two sleeve abutments to limit the rotational movement of said sleeve, a handle mounted on said sleeve for rotational movement thereof, an outwardly extending flange integral with said sleeve, a plate secured to said valve body and engaging said sleeve flange for rotational movement only, a first slot in said sleeve mating with the end of said hot fluid channel for maximum opening thereto when said sleeve is at the first end of its travel but mismatched for zero flow when said sleeve is at its opposite or second end of its travel, a second slot in said sleeve mating said cold fluid channel for maximum opening thereto when said sleeve is at its second end of its travel but mismatched for zero flow when said sleeve is at its first end of its travel, a mixing chamber within said sleeve communicating with said first and second slots and also with said discharge channel, a valve closing said discharge channel, a valve stem mounted concentric with said sleeve and actuating said discharge valve, a handle mounted on the outer end of said valve stem, screw threads formed on a short length of said valve stem and mating with corresponding threads formed within said sleeve, a fluid seal between said valve stem and said sleeve, and a fluid seal between said sleeve and said valve body.

8. A mixing valve as described in claim 7 having said first and second slots elongated such that rotation of said sleeve in one direction progressively opens said first slot with respect to said hot entrance fluid channel in proportion to angular displacement of said sleeve while at the same time progressively closing said second slot with respect to said cold entrance fluid channel, or vice versa.

9. A mixing valve as described in claim 7 having said first and second slots proportioned such as to substantially restrict the fluid flowing thru them, each said restriction amounting to 10 to 50 percent of the total restriction of all passages within said mixing valve when the discharge valve is open.

10. A mixing device as described in claim 7 wherein the flows thru said hot and cold fluid channels are restricted by a combination of said slots formed in said sleeve and said hot and cold fluid channels only to a degree sufficiently to create a pressure differential, resulting from any unequal pressures existing between said hot and cold fluid channels, sufficient to move said valve member in a direction to restrict the flow thru the said hot or cold annular grooves experiencing the highest pressure, until said pressure differential in said hot and cold fluid channels is reduced to substantially zero.

References Cited in the file of this patent

UNITED STATES PATENTS

| | | |
|---|---|---|
| 962,111 | Assmann | June 21, 1910 |
| 990,557 | Holmen | Apr. 25, 1911 |
| 1,097,433 | Hill | May 19, 1914 |
| 2,158,342 | Trader | May 16, 1939 |
| 2,657,860 | Schmidt | Nov. 3, 1953 |
| 2,682,276 | Fraser | June 29, 1954 |
| 2,808,848 | Cooper | Oct. 8, 1957 |